(12) United States Patent
Ko et al.

(10) Patent No.: US 8,335,194 B2
(45) Date of Patent: Dec. 18, 2012

(54) METHOD FOR TRANSMITTING DATA IN MULTIPLE ANTENNA SYSTEM

(75) Inventors: Hyun Soo Ko, Anyang-si (KR); Bin Chul Ihm, Anyang-si (KR); Jin Young Chun, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 46 days.

(21) Appl. No.: 12/673,915

(22) PCT Filed: Aug. 20, 2008

(86) PCT No.: PCT/KR2008/004834
§ 371 (c)(1),
(2), (4) Date: Feb. 17, 2010

(87) PCT Pub. No.: WO2009/025489
PCT Pub. Date: Feb. 26, 2009

(65) Prior Publication Data
US 2011/0211539 A1      Sep. 1, 2011

(51) Int. Cl.
*H04W 4/00* (2009.01)
(52) U.S. Cl. ........................................ 370/334
(58) Field of Classification Search ........... 370/310–349
See application file for complete search history.

(56) References Cited

U.S. PATENT DOCUMENTS

| 7,881,247 | B2* | 2/2011 | Pan et al. | 370/319 |
| 2005/0286408 | A1* | 12/2005 | Jin et al. | 370/208 |
| 2007/0133708 | A1 | 6/2007 | Lee et al. | |
| 2007/0217388 | A1* | 9/2007 | Shiizaki et al. | 370/349 |
| 2008/0212701 | A1* | 9/2008 | Pan et al. | 375/260 |
| 2008/0232494 | A1* | 9/2008 | Pan et al. | 375/260 |
| 2008/0260059 | A1* | 10/2008 | Pan | 375/260 |
| 2009/0262699 | A1* | 10/2009 | Wengerter et al. | 370/330 |

FOREIGN PATENT DOCUMENTS

| KR | 10-2007-0046755 | 5/2007 |
| WO | WO 2006-098574 A1 | 9/2006 |

OTHER PUBLICATIONS

U.S. Appl. No. 60/890201; Pan; Method of Resource Block Specific Common Control Signaling.*

* cited by examiner

*Primary Examiner* — Andrew Lai
*Assistant Examiner* — Juvena Loo
(74) *Attorney, Agent, or Firm* — McKenna Long & Aldridge LLP (57) ABSTRACT

A method of transmitting data in a multiple antenna system includes transmitting a precoding matrix index (PMI) of a first user through a control channel for the first user, and transmitting the PMI of the first user and a PMI of a second user through a data channel for the first user. Effective data decoding is possible regardless of whether radio resources to be allocated to multiple users are partially or entirely allocated to the users.

6 Claims, 5 Drawing Sheets

METHOD FOR TRANSMITTING DATA IN MULTIPLE ANTENNA SYSTEM

This application is a national phase application based on International Application No. PCT/KR2008/004834, filed on Aug. 20, 2008, which claims priority to Korean Patent Application No. 10-2007-0083907, filed Aug. 21, 2007, all of which are incorporated by reference for all purposes as if fully set forth herein.

TECHNICAL FIELD

The present invention relates to wireless communications, and more particularly, to a data transmission method capable of effectively transmitting and decoding data of multiple users in a multiple antenna system.

BACKGROUND ART

Recently, to maximize performance and communication capability of wireless communication systems, attention is paid to a multiple input multiple output (MIMO) system. Being evolved from the conventional technique in which a single transmit (Tx) antenna and a single receive (Rx) antenna are used, a MIMO technique uses multiple Tx antennas and multiple Rx antennas in order to improve efficiency of data transmission and reception. The MIMO system is also referred to as a multiple antenna system. In the MIMO technique, instead of receiving one whole message through a single antenna path, data segments are received through a plurality of antennas and are then assembled into one piece of data. As a result, a data transfer rate can be improved in a specific range, or a system range can increase with respect to a specific data transfer rate.

The MIMO technique includes transmit diversity, spatial multiplexing, and beamforming. The transmit diversity is a technique in which the multiple Tx antennas transmit the same data so that transmission reliability increases. The spatial multiplexing is a technique in which the multiple Tx antennas simultaneously transmit different data so that data can be transmitted at a high speed without increasing a system bandwidth. The beamforming is used to add a weight factor to multiple antennas according to a channel condition so as to increase a signal to interference plus noise ratio (SINR) of a signal. The weight factor can be represented by a weight matrix which is referred to as a precoding matrix. The precoding matrix may be directly transmitted between a base station (BS) and a user. Alternatively, a precoding matrix index (PMI) may be transmitted instead of directly transmitting the precoding matrix.

The spatial multiplexing is classified into single-user spatial multiplexing and multi-user spatial multiplexing. The single-user spatial multiplexing is also referred to as a single user MIMO (SU-MIMO). The multi-user spatial multiplexing is also referred to as a spatial division multiple access (SDMA) or a multi user MIMO (MU-MIMO). A capacity of a MIMO channel increases in proportion to the number of antennas. The MIMO channel can be decomposed into independent channels. If the number of Tx antennas is Nt, and the number of Rx antennas is Nr, then the number of independent channels is Ni where Ni≦min{Nt, Nr}. Each independent channel can be referred to as a spatial layer. A rank represents the number of non-zero eigen-values of the MIMO channel and can be defined as the number of spatial streams that can be multiplexed. The precoding matrix may be a precoding vector when a rank is 1.

In the MU-MIMO system, pairing can be performed on radio resources for multiple users. Pairing denotes allocation of radio resources to the multiple users by entirely or partially overlapping the radio resources over a frequency domain or a time domain. The multiple users can share the overlapping radio resources over the frequency domain or the time domain. In the MU-MIMO system, pairing can be performed on data of users, wherein the number of users corresponds to the number of Tx antennas. For example, if a BS has 4 Tx antennas, the BS can perform pairing for 2 to 4 users.

In a region where the radio resources are paired, data of other users acts as interference to data of a current user. Thus, there is a need for a method for effectively canceling interference caused by data of other users from data of a current user.

DISCLOSURE OF INVENTION

Technical Problem

The present invention provides a method for transmitting data whereby interference caused by other paired users can be effectively dealt with in a multiple antenna system.

Technical Solution

In an aspect, a method of transmitting data in a multiple antenna system includes transmitting a precoding matrix index (PMI) of a first user through a control channel for the first user, and transmitting the PMI of the first user and a PMI of a second user through a data channel for the first user.

In another aspect, a method of transmitting data in a multiple antenna system includes allocating radio resources to a plurality of users, wherein the radio resources are paired so that the radio resources partially or entirely overlap with each other, transmitting a PMI of one of the plurality of users through a first channel, and transmitting PMIs of the plurality of users through a second channel in the radio resources after multiplexing the PMIs of the plurality of users.

In another aspect, a method for processing data in a multiple antenna system includes receiving a PMI through a control channel, receiving a multiplexed PMI through a data channel, wherein the PMI and a PMI of different user are multiplexed in the multiplexed PMI, and a radio resource for the data channel is partially or entirely shared with the different user, de-multiplexing the PMI and the PMI of different user from the multiplexed PMI on the data channel by using the PMI on the control channel, and reproducing data on the data channel by using the de-multiplexed PMI.

Advantageous Effects

According to the present invention, effective data decoding is possible regardless of whether radio resources to be allocated to multiple users are partially or entirely paired. Therefore, the radio resources can be further flexibly allocated to the users.

MODE FOR THE INVENTION

Hereinafter, exemplary embodiments of the present invention will be described in detail with reference to the accompanying drawings.

Figure 1:
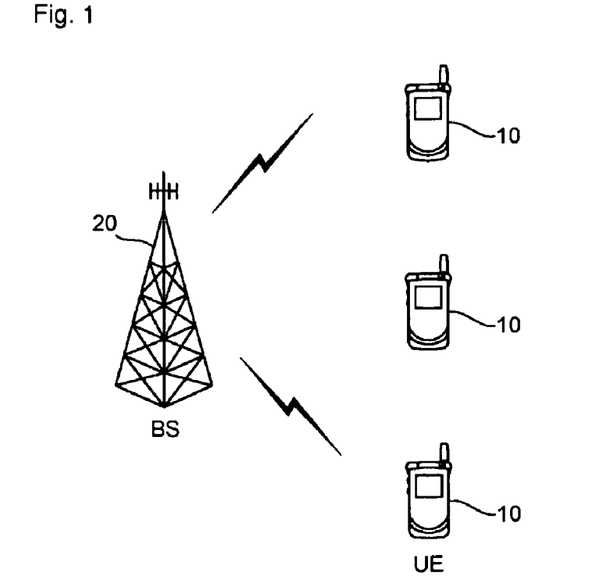
FIG. 1 shows a wireless communication system.

FIG. 1 shows a wireless communication system. The wireless communication system can be widely deployed to provide a variety of communication services, such as voices, packet data, etc.

Referring to FIG. 1, the wireless communication system includes at least one user equipment (UE) 10 and a base station (BS) 20. The UE 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as a node-B, a base transceiver system (BTS), an access point, etc. There are one or more cells within the coverage of the BS 20.

Hereinafter, a downlink is defined as a communication link from the BS 20 to the UE 10, and an uplink is defined as a communication link from the UE 10 to the BS 20.

There is no restriction on a multiple access scheme used in the wireless communication system. The multiple access scheme may be based on code division multiple access (CDMA), time division multiple access (TDMA), frequency division multiple access (FDMA), single-carrier FDMA (SC-FDMA), orthogonal frequency division multiple access (OFDMA), or other well-known modulation schemes. For clarity, the OFDMA-based wireless communication system will be described hereinafter.

The wireless communication system may be a multiple antenna system. The multiple antenna system may be a multiple input multiple output (MIMO) system. The multiple antenna system may be a multiple-input single-output (MISO) system, a single-input single-output (SISO) system, or a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

In the wireless communication system, the BS and the UE transmit control information and user data. The control information may be transmitted on a control channel. The user data may be transmitted on a data channel. The control information includes a plurality of signals other than the user data. That is, the control information includes a user identification (ID), data allocation information, modulation and coding scheme (MCS), hybrid automatic repeat request (HARQ), MIMO information, etc. The MIMO information includes a precoding matrix index (PMI), rank information (RI), MIMO mode information of SU-MIMO or MU-MIMO, etc.

The control channel can carry only the control information. The data channel can carry the user data together with the control information. That is, when the UE transmits the control information alone, the control information can be transmitted on the control channel. In addition, when the UE transmits the control information together with the user data, the control information can be transmitted on the control channel, or the user data and the control information may be multiplexed and transmitted on the data channel.

Pairing can be performed on data of multiple users in the data channel. Pairing denotes allocation of radio resources to multiple users by entirely or partially overlapping the radio resources over a frequency domain or a time domain. When pairing for multiple users allocates the same radio resource over the frequency domain and the time domain, this is called single-band paring. When pairing for multiple users allocates radio resources in different ranges over the frequency domain or the time domain, this is called multi-band pairing.

Now, pairing for multiple users and a method for processing paired data will be described.

Figure 2:
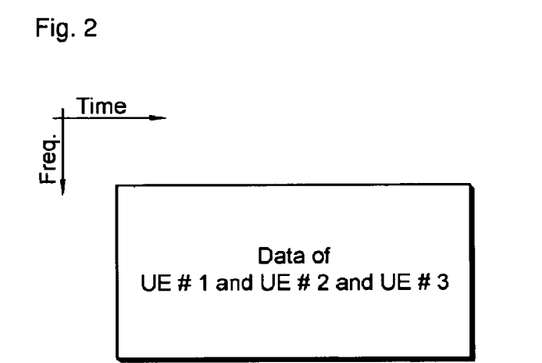
FIG. 2 shows an example of single-band paring.

FIG. 2 shows an example of single-band paring.

Referring to FIG. 2, single-band paring is allocation of radio resource to multiple users by entirely overlapping the radio resource over a frequency domain and a time domain. Each user allocated with the same radio resource can share the radio resource. Herein, the same radio resource over the frequency domain and the time domain is allocated to data of a first user (UE #1), a second user (UE #2), and a third user (UE #3). However, this is for exemplary purposes only, and the frequency domain and the time domain of the radio resources to be paired have no limit in terms of ranges. Thus, the number of users to be paired can change variously.

Table 1 below shows an example of types of information that can be carried on a control channel and a data channel in single-band paring.

TABLE 1

| type | control channel | data channel |
|---|---|---|
| A | user ID, data allocation information, MCS, HARQ, MIMO information, user PMI and interfering user PMI | data for each user or data for multiple users |
| B | user ID, data allocation information, MCS, HARQ, MIMO information, user PMI | data for each user or data for multiple users, dedicated channel for interfering user PMI |

In the single-band paring, information carried on the control channel and the data channel may have a type 'A'. The control channel may carry a user ID, data allocation information, MCS, HARQ, MIMO information, and a PMI of each user and a PMI of an interfering user. When a rank is 1, a PMI is a precoding vector for each user, and can be referred to as a precoding vector index (PVI). A user PMI denotes a precoding vector given to each user. An interfering user PMI denotes a precoding vector of other paired users. The data channel carries data for each user or data for multiple users.

In the single-band pairing, information carried on the control channel and the data channel may have a type 'B'. An interfering user PMI is carried on a dedicated channel included in the data channel. The dedicated channel is a channel for carrying a PMI for each user. The dedicated channel may be located in an arbitrary area within the data channel. That is, the interfering user PMI carried on the control channel in the type 'A' is carried on the dedicated channel included in the data channel in the type 'B'. This is for exemplary purposes only. For example, the dedicated channel for the interfering user PMI may be included in the control channel, and the PMI of each user may be carried on the data channel. In addition, the dedicated channel may be included in a separate region independent from the control channel and the data channel.

Figure 3:
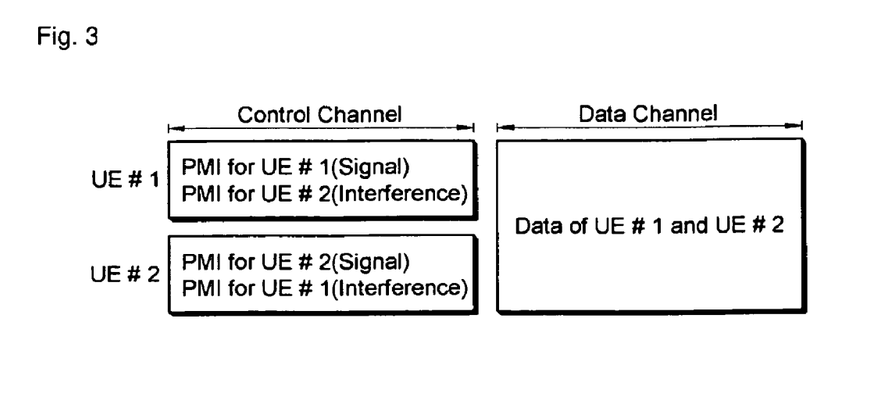
FIG. 3 shows an example of a control channel and a data channel in single-band paring according to an embodiment of the present invention.

FIG. 3 shows an example of a control channel and a data channel in single-band paring according to an embodiment of the present invention.

Referring to FIG. 3, it is assumed that data channels assigned to two users UE #1 and UE #2 are single-band paired. A control channel of each user includes a PMI of each user and a PMI of an interfering user. That is, a PMI for UE #1 and a PMI for UE #2 are carried on a control channel of UE #1. For UE#1, the PMI for UE #1 acts as a control signal for data but the PMI for UE #2 acts as an interference signal. The PMI for UE #2 and the PMI for UE #1 are carried on a control channel of UE #2. For UE#2, the PMI for UE #2 acts as a control signal for data but the PMI for UE #1 acts as an interference signal.

In the data channel, data of UE #1 and UE #2 is paired in the same frequency domain and the same time domain. In this case, the data channel may include a control channel for the PMIs of UE #1 and UE #2. The control channel for PMI indicates a PMI used for each user data.

Each user can de-multiplex and decode data of UE #1 and UE #2 by using the PMI of each user included in the control channel of each user and the PMI of the interfering user, wherein the data is included in the data channel.

Figure 4:
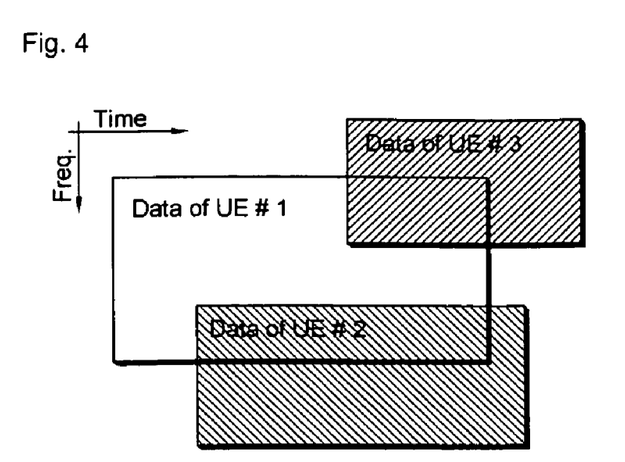
FIG. 4 shows an example of multi-band paring.

FIG. 4 shows an example of multi-band paring.

Referring to FIG. 4, multi-band paring is allocation of radio resource to multiple users by partially overlapping the radio resource in different ranges over a frequency domain or a time domain. Each user can share the overlapping radio resources. Herein, different frequency-domain and time-domain radio resources are allocated to data of UE #1, data of UE #2, and data of UE #3. However, this is for exemplary purposes only, and the frequency domain and the time domain of the radio resources to be paired have no limit in terms of the ranges. Thus, the number of users to be paired can change variously.

Table 2 below shows information carried on a control channel and a data channel in case of using the multi-band paring.

TABLE 2

| control channel | data channel |
|---|---|
| user ID, data allocation information, MCS, HARQ, MIMO information, user PMI | data for each user or data for multiple users, dedicated channel for interfering user PMI |

In case of the aforementioned single-band pairing, the number of interfering user PMIs can be limited by the number of antennas. Thus, the interfering user PMIs can be included in the control channel of each user when transmitted. In addition, when a rank and a PMI are used for a whole system band, the PMI may have a fixable size. However, in case of the multi-band pairing, various modifications can be made without limit in the number of partially overlapping interfering users. Thus, it may not be preferable to include the PMI of the interfering user to the control channel of each user. Therefore, in case of the multi-band pairing, it is preferable to transmit the interfering user PMI by carrying it on the dedicated channel included in the data channel.

This is for exemplary purposes only. For example, the dedicated channel for the interfering user PMI may be included in the control channel, and the PMI of each user may be carried on the data channel. In addition, the dedicated channel may be included in a separate region independent from the control channel and the data channel.

Figure 5:
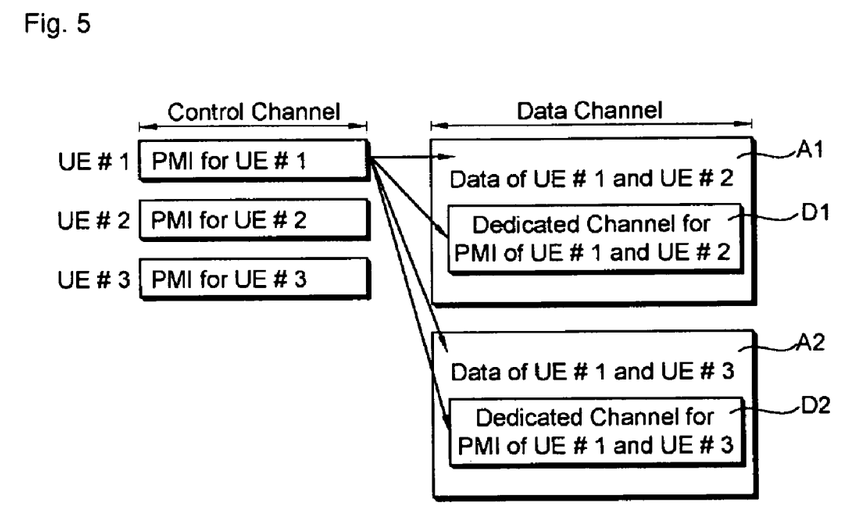
FIG. 5 shows an example of a control channel and a data channel in multi-band pairing according to an embodiment of the present invention.

FIG. 5 shows an example of a control channel and a data channel in multi-band pairing according to an embodiment of the present invention.

Referring to FIG. 5, it is assumed that data channels assigned to three users (i.e., UE #1, UE #2, UE #3) are multi-band paired. A control channel of each user includes a PMI of each user. That is, a control channel of UE#1 carries a PMI for UE #1. A control channel of UE #2 carries a PMI for UE #2. A control channel of UE #3 carries a PMI for UE #3.

The data channel includes a region A1 in which data of UE #1 and UE #2 overlaps and a region A2 in which data of UE #1 and UE #3 overlaps. The region A1 includes a dedicated channel D1 for PMIs of UE #1 and UE #2. The PMI of UE #1 and the PMI of UE #2 may be multiplexed and then carried on the dedicated channel D1. Multiplexing of PMI will be described below. In the region A1, UE #2 acts as an interfering user with respect to UE #1, and UE #1 acts as an interfering user with respect to UE #2. The region A2 includes a dedicated channel D2 for PMIs of UE #1 and UE #3. The PMI of UE #1 and the PMI of UE #3 may be multiplexed and then carried on the dedicated channel D2. In the region A2, UE #3 acts as an interfering user with respect to UE #1, and UE #1 acts as an interfering user with respect to UE #3. The region A1 may include a control channel for the PMIs of UE #1 and UE #2. The region A2 may include a control channel for the PMIs of UE #1 and UE #3. In other words, the PMI of UE #1 may be included in the regions A1 and A2 and the dedicated channels D1 and D2. The PMI of UE #2 may be included in the region A1 and the dedicated channel D1. The PMI of UE #3 may be included in the region A2 and the dedicated channel D2.

When the control channel is referred to as a first channel and the data channel is referred to as a second channel, the first channel includes a PMI of a single user and the second channel includes a plurality of multiplexed PMIs of multiple users. Data of multiple users is included in the second channel, wherein data of a single user can be detected from the data of multiple users by using a PMI of the first channel and a PMI of the second channel.

That is, according to a PMI included in the control channel, each user can know a PMI of an interfering user from the dedicated channel. Further, by using the PMI of the interfering user, each user can de-multiplex data of other paired users from the data channel and can decode data of each user. Such a detection method will be described below.

Figure 6:
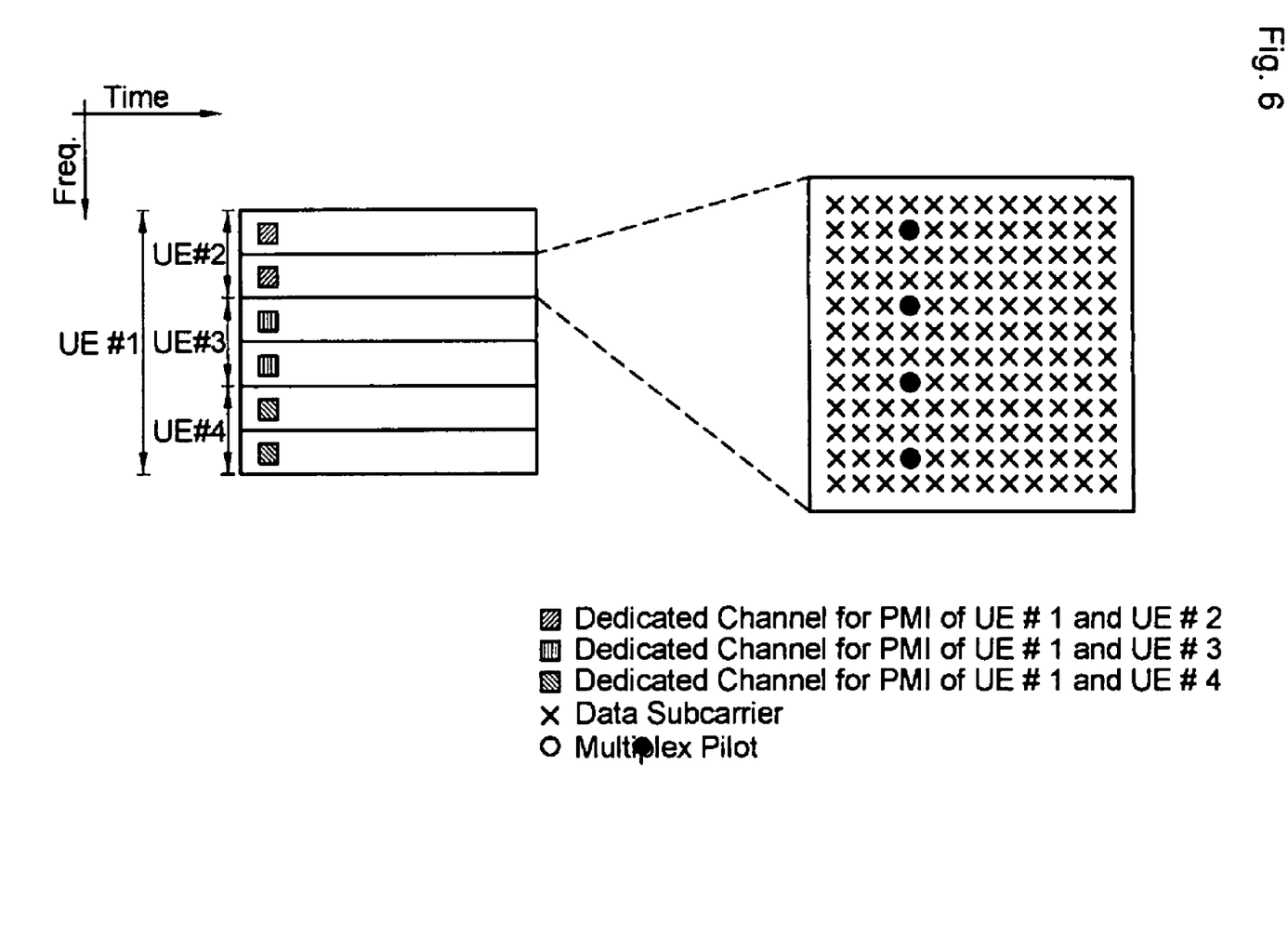
FIG. 6 shows an example of a structure of a dedicated channel in multi-band paring according to an embodiment of the present invention.

FIG. 6 shows an example of a structure of a dedicated channel in multi-band paring according to an embodiment of the present invention.

Referring to FIG. 6, it is assumed that data channels assigned to four users (i.e., UE #1, UE #2, UE #3, and UE #4) include six subbands. UE #1 is assigned with all six subbands. UE #2, UE #3, and UE #4 are assigned with two non-overlapping subbands and then are multi-band paired. The subband is a resource region for carrying at least one control signal or user data and includes a plurality of subcarriers. The subband may correspond to a resource block, a resource tile, a bin, etc.

Each subband may include a dedicated channel for a PMI of a UE. Each subband assigned to UE #1 and UE #2 in an overlap manner includes a dedicated channel for PMIs of UE #1 and UE #2. Each subband assigned to UE #1 and UE #3 in an overlap manner includes a dedicated channel for PMIs of UE #1 and UE #3. Each subband assigned to UE #1 and UE #4 includes a dedicated channel for PMIs of UE #1 and UE #4.

A plurality of subcarriers included in a subband may be data subcarriers or pilot subcarriers. The data subcarrier can include user data. The pilot subcarrier can include a pilot. The pilot may be a multiplex pilot which is obtained by multiplexing PMIs of paired users. For example, when the multiplex pilot is included in a subband assigned to UE #1 and UE #2 in an overlap manner, the multiplex pilot indicates the PMI of UE #1 and the PMT of UE #2. A plurality of multiplex pilots included in a subband constitute a dedicated channel for PMI. For example, when four multiplex pilots indicate one PMI, the four multiplex pilots constitute one dedicated channel.

The position and the size of the dedicated channel are not limited as shown in the figure. Thus, the dedicated channel may be located in any positions in the data channel, and the position and the number of multiplex pilots constituting the dedicated channel may change variously.

Figure 7:
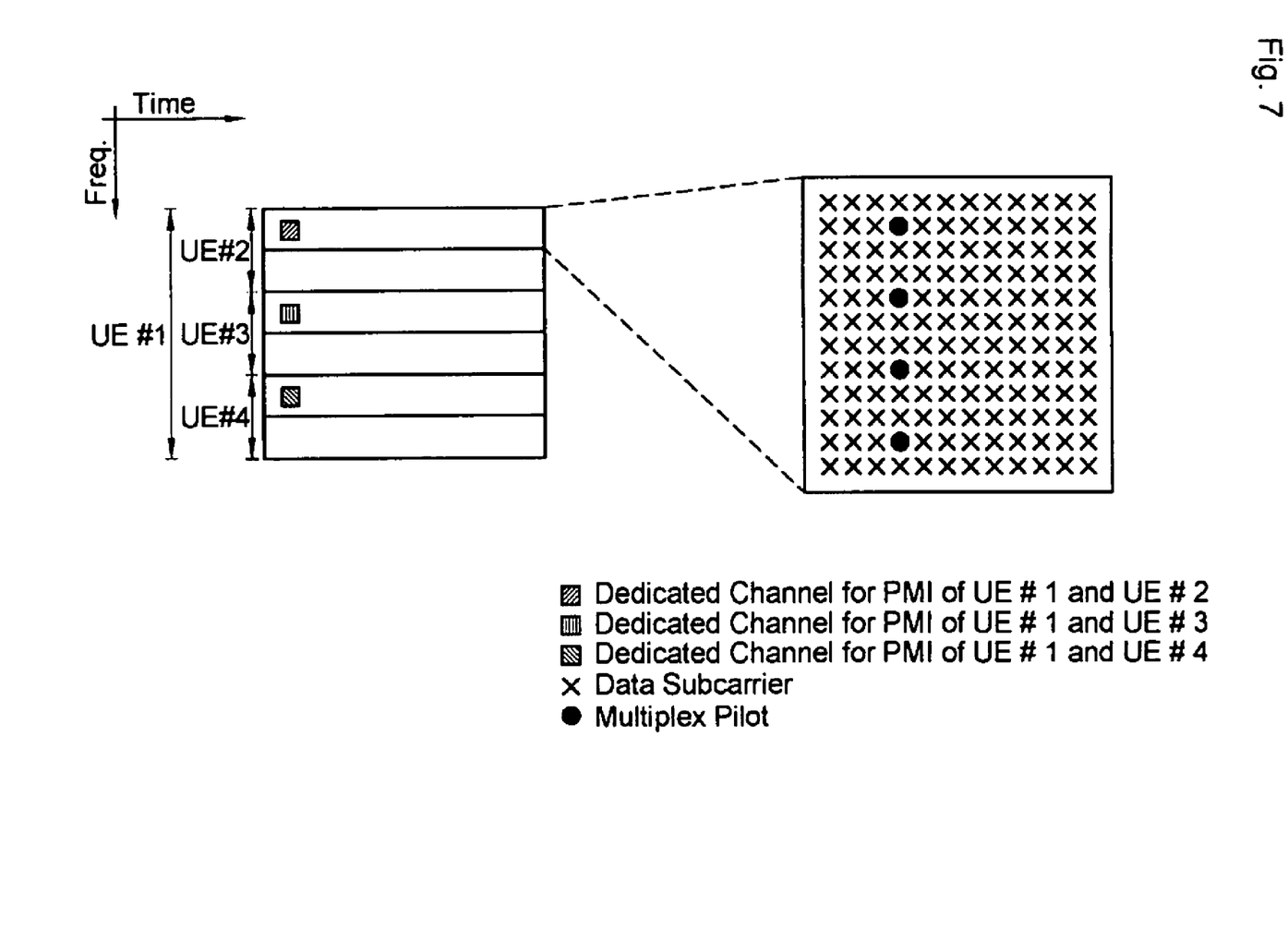
FIG. 7 shows an example of a structure of a dedicated channel in multi-band paring according to another embodiment of the present invention.

FIG. 7 shows an example of a structure of a dedicated channel in multi-band paring according to another embodiment of the present invention.

Referring to FIG. 7, the dedicated channel may be included in only some parts of subbands assigned in an overlap manner instead of being included in all subbands. For example, the dedicated channel may be included in only one subband among two subbands assigned to UE #1 and UE #2 in an overlap manner.

This is for exemplary purposes only, and the position and the number of dedicated channels included in a plurality of subbands assigned to two or more users in an overlap manner may change variously. For example, among a plurality of subbands assigned to a plurality of users in an overlap manner, the dedicated channel may be included only in odd subbands or even subbands or may be included only in a first subband or a last subband or may be included in another possible manner. In addition, instead of including one dedicated channel consisting of a plurality of multiplex pilots to one subband, the multiplex pilots may be distributed over a plurality of subbands.

Now, a method for decoding data of a current user by excluding data of other users will be described. Herein, multi-band paired data is used. Although a case where a UE detects the multi-band paired data in downlink will be described, the same will also apply when the multi-band paired data is detected in uplink.

Figure 8:
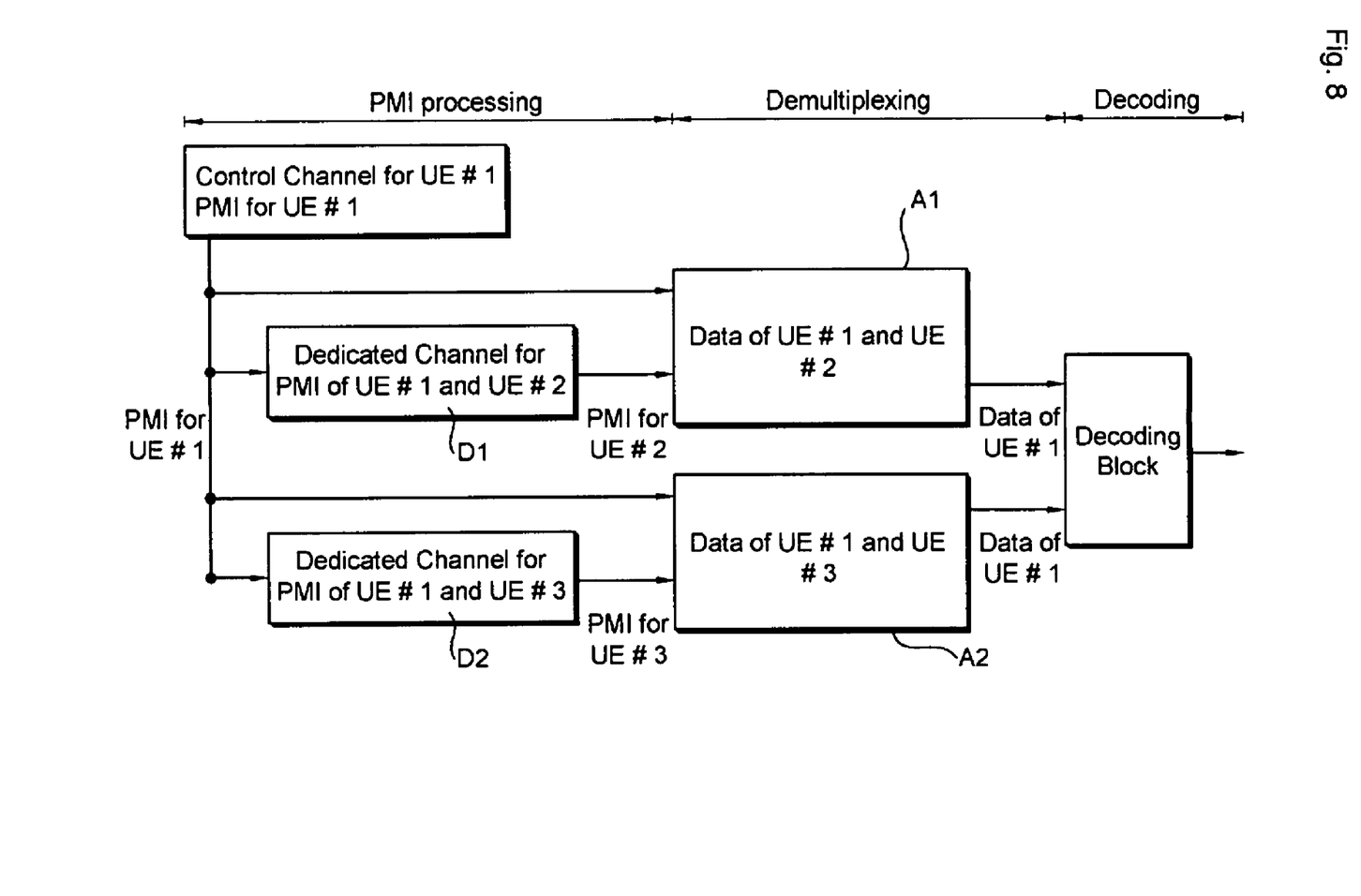
FIG. 8 is a block diagram showing a data processing method according to an embodiment of the present invention.

FIG. 8 is a block diagram showing a data processing method according to an embodiment of the present invention. It is assumed that UE #1 detects data of UE #1 when multi-band pairing is achieved as shown in FIG. 5.

Referring to FIG. 8, a BS can allocate radio resources to multiple users by using multi-band pairing. In this case, multiplex pilots of the multiple users in a dedicated channel can be expressed by Equation 1 below.

MathFigure 1

$$X = W_{signal}S_{interference} + W_{interference}S_{signal} \quad \text{[Math.1]}$$

In Equation 1, $W=[W_1\ W_2\ \ldots\ W_N]$, $W_n=[W_{1n}\ W_{2n}\ \ldots\ W_{Kn}]^T$, $W_n \in C^{K \times 1}$, $S=[S_1\ S_2\ \ldots\ S_N]$, $W_n=[S_n(1)\ S_n(2)\ \ldots\ S_n(M)]^T$, and $S_n \in C^{M \times 1}$. X denotes a multiplex pilot, W denotes a PMI of each user, and S denotes a sequence specified for each user and is associated with the PMI. $(.)_{signal}$ denotes a signal of a current user, and $(.)_{interference}$ denotes a signal of an interfering user. N denotes the number of weight vectors indicating the PMI, K denotes the number of Tx antennas, and M denotes a sequence length. The PMI may have N weight vectors. An arbitrary weight vector $W_n$ included in the PMI consists of a plurality of symbols, wherein the number of symbols corresponds to the number K of Tx antennas. The sequence S may have a plurality of sequences, wherein the number of the sequences corresponds to the number N of weight vectors. The sequence length M may correspond to the number of subcarriers. That is, in order to obtain the multiplex pilot, a weight vector of the current user is multiplied by a sequence of the interfering user, and then the multiplication result is added to a multiplication between a weight vector of the interfering user and a sequence of the current user. For example, to obtain the multiplex pilot of the dedicated channel D1, the weight vector of UE #1 is multiplied by the sequence of UE #2, and the multiplication result is added to a multiplication between the weight vector of UE #2 and the sequence of UE #1. In addition, to obtain the multiplex pilot of the dedicated channel D2, the weight vector of UE #1 is multiplied by the sequence of UE #3, and the multiplication result is added to a multiplication between the weight vector of UE #3 and the sequence of UE #1.

The multiplex pilot transmitted by the BS can be received according to a channel environment as expressed by Equation 2 below.

MathFigure 2

$$Y = H_{signal}W_{signal}S_{interference} + H_{signal}W_{interference}S_{signal} + N \quad \text{[Math.2]}$$

In Equation 2, Y denotes an Rx signal, $H_{signal}$ denotes a channel environment of a current user, and N denotes noise.

UE #1 receives a signal (e.g., the signal Y) and then performs PMI processing in the control channel and the dedicated channel. UE #1 can know the PMI for UE #1 from a control channel for UE #1. That is, UE #1 can know $W_{signal}$ and $S_{signal}$. Further, UE #1 can obtain $H_{signal}$ through channel estimation.

UE #1 can detect the PMI for UE #2 from the dedicated channel D1 by using the PMI for UE #1. Further, UE #1 can detect the PMI for UE #3 from the dedicated channel D2. As a method for detecting the PMI of the interfering user, a maximum ratio combining (MRC) method or a maximum likelihood (ML) method can be used.

In one embodiment, when the MRC method is used to detect the PMI of the interfering user, the sequence of the interfering user can be estimated as expressed by Equation 3 below.

MathFigure 3

$$S_{est,interference} = (H_{signal}W_{signal})^H Y \quad \text{[Math.3]}$$

In Equation 3, $S_{est,interference}$ denotes an estimation sequence of the interfering user, and $(.)^H$ denotes a Hermitian matrix. Since weight vectors have orthogonality, a multiplication between the channel environment $H_{signal}$ of the current user and the weight vector $W_{interference}$ of the interfering user can be nulled in Equation 2.

For example, the PMI of UE #1 and the PMI of UE #2 can be carried on four multiplex pilots as shown in Table 3 below.

TABLE 3

| Subcarrier #1 | Subcarrier #2 | Subcarrier #3 | Subcarrier #4 |
|---|---|---|---|
| $W_1S_2(1) +$ $W_2S_1(1)$ | $W_1S_2(2) +$ $W_2S_1(2)$ | $W_1S_2(3) +$ $W_2S_1(3)$ | $W_1S_2(4) +$ $W_2S_1(4)$ |

Herein, a sequence $S_1$ of UE #1 and a sequence $S_2$ of UE #2 can be expressed as follows.

$$S_1 = \{S_1(1), S_1(2), S_1(3), S_1(4)\}$$

$$S_2 = \{S_2(1), S_2(2), S_2(3), S_2(4)\}$$

An Rx signal received by UE #1 can be expressed as $Y_1(k)=H_1(k)\{W_1S_2(k)+W_2S_1(k)\}+N$, (k=1, 2, 3, 4). UE #1 can detect the sequence of UE #2 by using the MRC method as follows.

$$S_{est,2}(k)=(H_1(k)W_1)^H Y_1(k)$$

$$S_{est,2}=\{S_{est,2}(1),S_{est,2}(2),S_{est,2}(3),S_{est,2}(4)\}$$

An Rx signal received by UE #2 can be expressed as $Y_2(k)=H_2(k)\{W_1S_2(k)+W_2S_1(k)\}+N$, (k=1, 2, 3, 4). UE #2 can detect the PMI of UE #1 by using the MRC method as follows.

$$S_{est,1}(k)=(H_2(k)W_2)^H Y_2(k)$$

$$S_{est,1}=\{S_{est,1}(1),S_{est,1}(2),S_{est,1}(3),S_{est,1}(4)\}$$

In another embodiment, when the ML method is used to detect the PMI of the interfering user, the sequence of the interfering user can be detected as expressed by Equation 4 below.

Math Figure 4

$$\tilde{S}_{interference} = \arg\min_{i \in N} |Y - \hat{Y}_i| \qquad [\text{Math. 4}]$$

Herein, $$\hat{Y}_i = H_{signal}S_i + H_{signal}W_iS_{signal}.$$

That is, an arbitrary weight vector is iterated N times, where N denotes the number of weight vectors, and a weight vector which is the most similar to the Rx signal Y is found to detect the PMI of the interfering user.

By using the detected PMI of the interfering user, data is de-multiplexed from the data channel. To obtain a part of the data of UE #1, de-multiplexing is performed in the region A1 in which the data of UE #1 and UE #2 is paired by using the PMI of UE #1 and the PMI of UE #2. Herein, the PMI of UE #1 can be known in the control channel of UE #1 and the PMI of UE #2 is detected from the dedicated channel D1. In addition, to obtain the rest parts of the data of UE #1, de-multiplexing is performed in the region A1 in which the data of UE #1 and UE #3 is paired by using the PMI of UE #1 and the PMI of UE #3. Herein, the PMI of UE #3 is detected from the dedicated channel D2.

The de-multiplexed data is decoded. When the data is decoded, the data may be formed into a decoding block after the data of UE #1 is de-multiplexed in the regions A1 and A2.

A method for multiplexing and detecting PMIs for a plurality of users by using multiplex pilots in case of using multi-band paring has been described above. This method can also apply without alteration in case of using single-band paring. In addition, this method can also apply when a plurality of users use not only pairing but also contiguous sub-bands, and PMIs for the users are multiplexed and detected.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data in a multiple antenna system, the method comprising:
   transmitting a precoding matrix index (PMI) of a first user through a control channel for the first user; and
   transmitting the PMI of the first user and a PMI of a second user through a data channel for the first user by being multiplexed in a multiplex pilot,
   wherein the multiplex pilot is generated based on a weight vector of the PMI of the first user multiplied by a sequence of the second user and a weight vector of the PMI of the second user multiplied by a sequence of the first user.

2. The method of claim 1, wherein a radio resource allocated to the data channel for the first user partially overlaps with a radio resource allocated to a data channel for the second user.

3. The method of claim 1, wherein a radio resource allocated to the data channel for the first user entirely overlaps with a radio resource allocated to a data channel for the second user.

4. The method of claim 1, wherein the PMI of the first user and the PMI of the second user are transmitted through the data channel by being multiplexed in a multiplex pilot, and the multiplex pilot is expressed by:

$$X = W_{signal}S_{interference} + W_{interference}S_{signal},$$

where $W_{signal}$ denotes a weight vector of the PMI of the first user, $S_{interference}$ denotes a sequence of the second user, $W_{interference}$ denotes a weight vector of the PMI of the second user, and $S_{signal}$ denotes a sequence of the first user.

5. A method for processing data in a multiple antenna system, performed by a first user, the method comprising:
   receiving a precoding matrix index (PMI) of the first user through a control channel;
   receiving a multiplexed PMI through a data channel, wherein the PMI of the first user and a PMI of second user are multiplexed in the multiplexed PMI, and a radio resource for the data channel is partially or entirely shared with the second user;
   de-multiplexing the PMI of the first user and the PMI of second user from the multiplexed PMI on the data channel by using the PMI of the first user on the control channel; and
   reproducing data on the data channel by using the de-multiplexed PMI,
   wherein the multiplexed PMI is received via a multiplex pilot,
   and the multiplex pilot is generated based on a weight vector of the PMI of the first user multiplied by a sequence of the second user and a weight vector of the PMI of the second user multiplied by a sequence of the first user.

6. The method of claim 5, wherein the multiplex pilot is expressed by:

$$X = W_{signal}S_{interference} + W_{interference}S_{signal},$$

where $W_{signal}$ denotes the weight vector of the PMI of the first user, $S_{interference}$ denotes the sequence of the second user, $W_{interference}$ denotes the weight vector of the PMI of the second user, and $S_{signal}$ denotes the sequence of the first user.

* * * * *